No. 673,600. Patented May 7, 1901.
A. FEATHERSTONHAUGH.
ROLLER BEARING.
(Application filed Oct. 22, 1900.)
(No Model.) 2 Sheets—Sheet 1.

No. 673,600. Patented May 7, 1901.
A. FEATHERSTONHAUGH.
ROLLER BEARING.
(Application filed Oct. 22, 1900.)

(No Model.) 2 Sheets—Sheet 2.

Witnesses,
Inventor,
Arthur Featherstonhaugh,
By Offield Towle & Linthicum
Attys.

UNITED STATES PATENT OFFICE.

ARTHUR FEATHERSTONHAUGH, OF LAKESIDE, ILLINOIS, ASSIGNOR OF ONE-HALF TO HOLMES HOGE, OF CHICAGO, ILLINOIS.

ROLLER-BEARING.

SPECIFICATION forming part of Letters Patent No. 673,600, dated May 7, 1901.

Application filed October 22, 1900. Serial No. 33,874. (No model.)

*To all whom it may concern:*

Be it known that I, ARTHUR FEATHERSTONHAUGH, of Lakeside, in the county of Cook and State of Illinois, have invented certain new and useful Improvements in Roller-Bearings, of which the following is a specification.

This invention relates to improvements in roller-bearings, and refers more specifically to an improved bearing adapted for vehicle-wheel journals, although capable of use in other connections.

The object of the invention is to provide a simple, durable, and light-running journal-bearing wherein special means are provided for radially and accurately adjusting the parts to compensate for wear, the construction being such that that compensating adjustment referred to is necessarily uniform throughout the circumference of the journal and throughout the length of the several roller elements thereof.

To this end the invention consists in the matters hereinafter described, and more particularly pointed out in the appended claims, and will be readily understood from the following description, reference being had to the accompanying drawings, in which—

Figure 1:
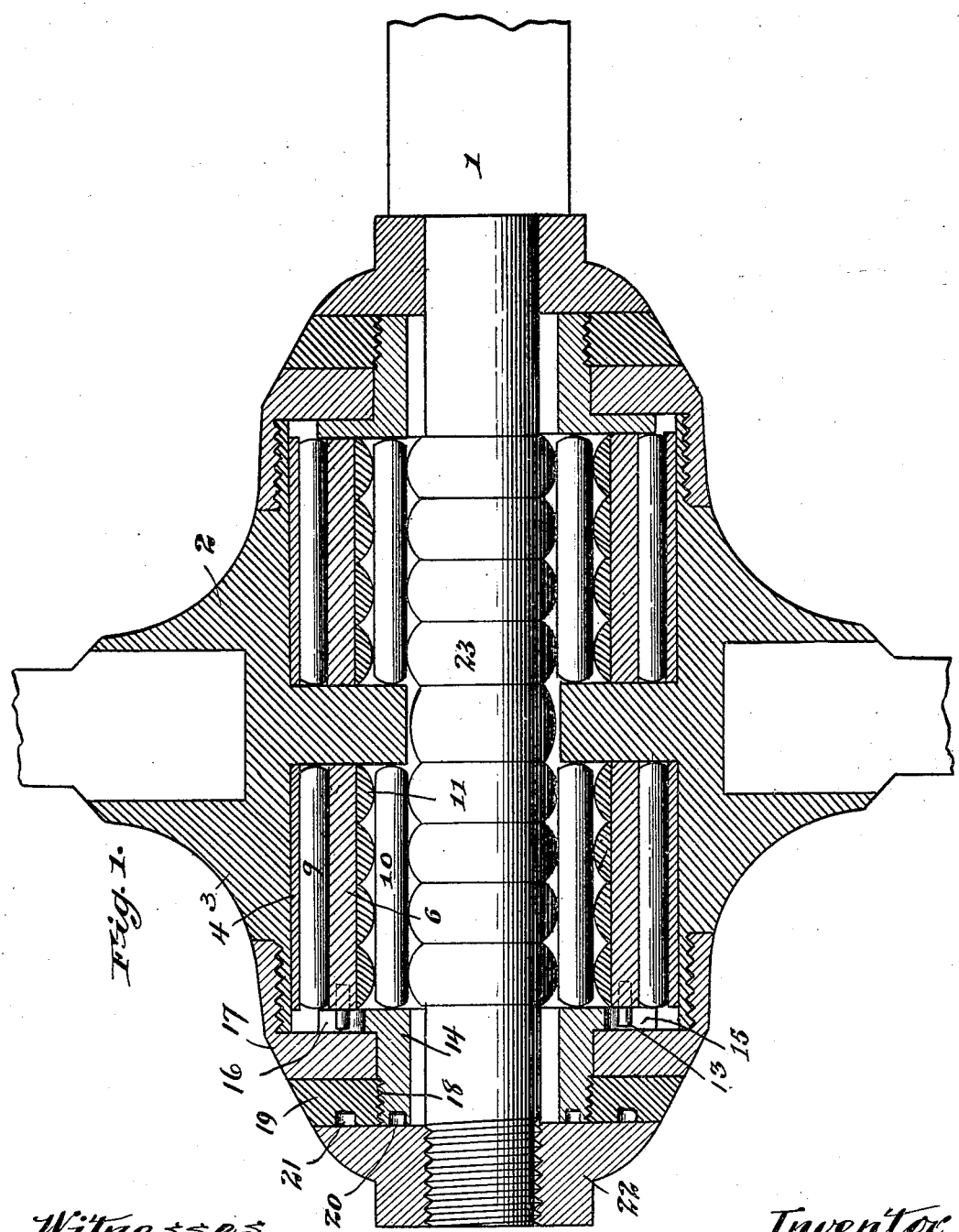
Figure 2:
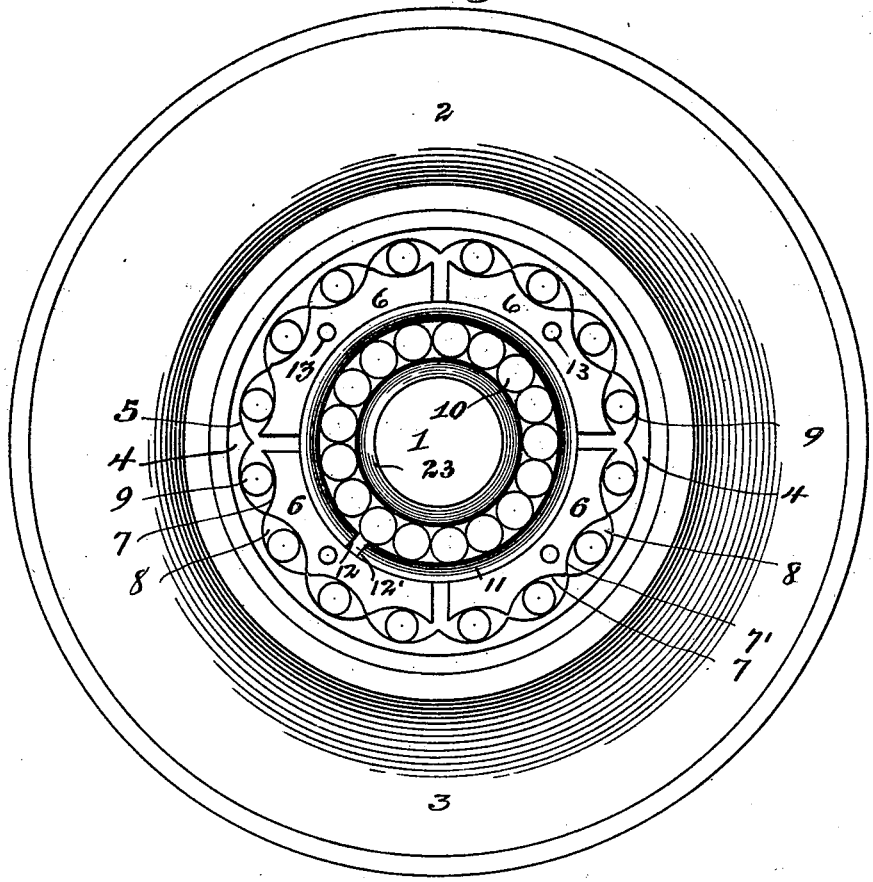
Figure 3:
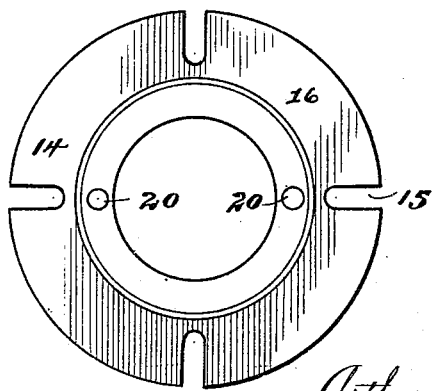

Figure 1 is an axial sectional view of a vehicle hub and journal embodying my invention. Fig. 2 is an end view of the same, with the adjusting and locking rings removed, looking at the outer end of the journal; and Fig. 3 is a plan or face view of the adjusting-ring.

Referring to said drawings, 1 designates as a whole any suitable journal or axle, and 2 the wheel-hub mounted thereon. In the present instance the journal is shown as comprising two sets of cylindric rollers arranged in the opposite ends of the hub; but it is to be understood that a single set may equally embody the invention, the two sets shown in the present instance being substantially duplications of each other. For convenience of description but one end of the hub will be described in detail, it being understood that the opposite end is substantially similar, differing only in those details necessary to adapt it to the corresponding portion of the axle.

Within the outer shell 3 of the hub is seated a fixed bearing-ring 4, provided in its inner face with a series of circumferential grooves 5, parti-circular in cross-section and extending parallel with the axis of the journal. Within said bearing-ring 4 is arranged a series of segmental adjusting-blocks 6, each provided in its outer surface with grooves 7, parti-circular in cross-section and corresponding to the grooves 5 of the bearing-ring and forming in conjunction with the latter a series of elliptical spaces 8, within each of which is arranged an adjusting-roller 9 of a diameter approximately equal to the diameter of the elliptical space within which it is seated when the adjusting-block is in the position indicated in the drawings or adjusted radially outward to its extreme limit. Around the journal 1 is arranged a circumferential series of cylindric rollers 10, and between the rollers 10 and the adjusting-blocks 6 is interposed a series of divided bearing-rings 11. Preferably and as shown in the present instance such rings are convex upon their inner faces, which bear upon the roller elements, and cylindric at their outer faces, which rest in contact with the adjusting-blocks 6, so as to afford a point or line bearing, as distinguished from an extended surface-bearing, thereby minimizing the rolling friction of the journal. The proximate ends 12 and 12' of each ring are separated sufficiently to allow the ring to be contracted enough to compensate for any reduction in the circumferential size of the set of rollers due to wear, and in order that the rollers may not drop into the spaces between the interrupted ends of the rings a plurality of such rings are provided and arranged in such relation to each other within the journal that the interrupted portion of one ring will be overlapped by the uninterrupted portion of adjacent and other rings.

It will be obvious from the foregoing description that if the adjusting-blocks 6 be moved circumferentially while the fixed bearing-ring 4 remains immovable the adjusting-rollers 9 will be caused to act upon the adjusting-blocks to force the latter radially inward to an extent proportional to the extent to which the projections 7', formed by the inclined sides of the grooves 7, are carried beneath the adjusting-rollers, and the adjusting-blocks thus moving inwardly will in turn compress the bearing-rings 11, and thus contract the diameter of the journal-box within which the main rollers 10 are located. In order to thus actuate and adjust the adjusting-blocks, each of said segments is provided at its outer end with a stud or projection 13, which projects within a radial slot 15, formed in an adjusting-ring 14, rotatably mounted upon the end of the journal adjacent to the set of rollers and provided with a radial flange portion 16, within which said slots 15 are formed. The adjusting-ring 14 is confined in position by means of an outer hub-ring 17, the inner portion of which overlaps the flanged portion of the adjusting-ring, as indicated clearly in the drawings, and in order to lock the adjusting-ring in any desired position of angular adjustment it is extended outwardly beyond the confining-ring 17 and threaded, as indicated at 18, to receive a lock-nut 19. The end face of the adjusting-ring 14 is suitably constructed for engagement with a spanner, being in the present instance provided with spanner-recesses 20, whereby it may be turned, and the lock-nut 19 is likewise provided with similar spanner-recesses 21. The end of the journal is provided with the usual retaining-nut 22, whereby the hub as a whole is secured upon the axle or journal. The construction of the opposite end of the hub is substantially similar and need not, therefore, be repeated. In the particular instance illustrated that part of the journal upon which the rollers act is provided with a plurality of closely-fitting bearing-rings 23, arranged side by side and having convex surfaces, as indicated clearly in the drawings, these rings being provided for the purpose of affording a line or point bearing instead of an extended surface-bearing. Said rings are arranged to fit the axle closely enough to be retained in position frictionally. It will be obvious that these rings may be dispensed with and the rollers arranged to bear directly upon the journal, if preferred.

The adjustment and operation of the journal will be entirely obvious from the foregoing description and need not, therefore, be set forth at length. It may be noted, however, that as the bearings become worn by use, so as to afford more or less looseness between the roller elements and the journal, the journal-box may be in effect closed up or made smaller by simply adjusting the bearing-blocks circumferentially in one direction or the other, so that the adjusting-rollers interposed between the opposing grooves will act cam fashion to force the said adjusting-blocks radially inward, and thus compress and contract the split bearing-rings 11 upon which they act. Obviously such adjustment will be uniform throughout the entire circumference of the journal and throughout the entire axial length of the set of roller elements.

While I prefer to employ the particular construction shown, yet it will be obvious that this construction consists, essentially, of adjusting-blocks acted upon by cam-surfaces, which serve to force them radially inward when moved relatively to said cam-surface in a circumferential direction, and the principle of the invention may obviously be embodied in different constructions from that shown herein. I do not therefore wish to be limited to the details of construction shown, except as they may be made the subject of specific claims.

I claim as my invention—

1. A journal-bearing comprising a journal, a bearing-ring surrounding said journal, a series of roller elements interposed between the journal and bearing-ring and means for adjusting the size of the journal-box comprising a series of segments provided with cam-surfaces and relatively-fixed cam projections acting upon said segments to force the latter radially inward when the segments are moved circumferentially, substantially as described.

2. In a roller-bearing, the combination of a journal, a series of roller elements surrounding said journal, a plurality of divided rings surrounding said set of roller elements and means for varying the internal diameter of said divided rings, comprising a series of segments, provided with cam-surfaces, corresponding cam projections carried by a relatively-fixed part of the journal and operating to force said segments radially inward as they are moved circumferentially and means for moving said segments circumferentially and locking them in adjusted position, substantially as described.

3. In a journal-bearing, the combination of a journal, a series of roller elements surrounding said journal, a plurality of divided bearing-rings inclosing said roller elements and means for varying the internal diameter of said divided rings, comprising a plurality of circumferentially-disposed segments, each provided in its periphery with longitudinally-extending recesses and forming cam-surfaces, an annular member inclosing said segments and provided with cam projections extending toward said segments, a series of roller elements interposed between said annular member and said segments, means for simultaneously moving said segments circumferentially of the journal and means for locking said segments in adjusted position, substantially as described.

4. In a roller-bearing, the combination of a journal, a series of cylindric roller elements surrounding said journal, a plurality of divided rings inclosing said roller elements, a plurality of circumferentially-disposed adjusting blocks or segments arranged to act upon the exterior of said divided rings, each provided in its outer surface with a series of longitudinally-extending parti-circular grooves, a fixed ring or housing inclosing said segments, provided in its inner face with corresponding parti-circular grooves, a series of roller elements interposed between said segments and said housing-ring, an adjusting-ring mounted upon the end of the journal adjacent to the ends of said adjusting-segments, interconnecting devices between said adjusting-ring and said segments whereby the latter may be moved positively circumferentially of the journal while free to move radially and a lock-nut adapted to lock said adjusting-ring in fixed angular relation to the journal-box, substantially as described.

5. In a journal-bearing of the character described, herein, the combination of the hub-shell 3 provided in each end with a cylindric bearing-recess, the fixed rings 4 seated within said cylindric recesses, the adjusting-segments 6 having the grooves 5 and intervening projections, a series of interposed rollers 9, the series of divided bearing-rings 11 having convex internal faces, the journal and the series of cylindric elements interposed between the divided bearing-rings and journal, the adjusting-ring 14 having the radial slots 15 engaged with the projections 13 of the adjusting-blocks, the confining-ring 17, the locking-ring 19 and the confining-nut 22 combined and operating, substantially as described.

ARTHUR FEATHERSTONHAUGH.

Witnesses:
ALBERT H. GRAVES,
FREDERICK C. GOODWIN.